Feb. 25, 1969 E. H. IRASEK 3,429,436

RANDOM ACCESS STORAGE AND RETRIEVAL DEVICE

Filed Feb. 17, 1966

INVENTOR.
EUGENE H. IRASEK
BY Fulwider, Patton, Rieber, Lee, and Utecht
ATTORNEYS Feb. 25, 1969 E. H. IRASEK 3,429,436

RANDOM ACCESS STORAGE AND RETRIEVAL DEVICE

Filed Feb. 17, 1966

INVENTOR.
EUGENE H. IRASEK
BY Lulwider, Patton, Rieber Lee, and Utecht
ATTORNEYS INVENTOR
EUGENE H. IRASEK
BY Zulwider, Patton, Rieber, Lee, and Utecht
ATTORNEYS INVENTOR
EUGENE H. IRASEK
BY Fulwider, Patton, Rieber Lee and Utecht
ATTORNEYS INVENTOR.
EUGENE H. IRASEK
BY Fulwider, Patton, Rieber, Lee, and Utecht
ATTORNEYS INVENTOR
EUGENE H. IRASEK
BY Fulwider, Patton, Rieber, Lee, and Utecht
ATTORNEYS INVENTOR.
EUGENE H. IRASEK
BY Fulwider, Patton, Rieber, Lee, and Utecht
ATTORNEYS United States Patent Office 3,429,436

Patented Feb. 25, 1969

3,429,436

RANDOM ACCESS STORAGE AND RETRIEVAL DEVICE

Eugene H. Irasek, Inglewood, Calif., assignor, by mesne assignments, to Security First National Bank, Los Angeles, Calif., a national banking association Filed Feb. 17, 1966, Ser. No. 528,231

U.S. Cl. 209—72 18 Claims

Int. Cl. B07c *5/344, 9/00;* B42f *21/12*

ABSTRACT OF THE DISCLOSURE

A random access storage and retrieval device in which a large number of items such as cards and the like are stored in a rotating drum in non-addressed random positions. The cards are individually identified by coding notches in their edges at the drum periphery and are selected and recalled individually, independently of other items and in any desired order, regardless of their location in the store, into a delivery position upon command. The items are addressed in a selector employing movable plates disposed in alternate positions corresponding to a binary zero and binary one code, with the address plates being received in the coding notches in an addressed item to permit partial withdrawal of the addressed item from the store. The items are provided with magnetic material at their coded edges and stationary magnets adjacent the address plates present pole faces to the card edges which are eccentric to the drum so that the addressed card follows the pole faces to effect an initial withdrawal of the card from the drum store. A sensor downstream of the selector senses a partially withdrawn card and de-energizes the rotating drum so that it stops with the partially-withdrawn, addressed card in the delivery station in engagement with manipulating means for withdrawing the card from the store and positioning it in X–Y directions. Mechanism is provided at the delivery station for operating on an item therein to finally index it in position and to separate adjacent items therefrom to facilitate the withdrawal and return of the item to the store by the X–Y manipulating mechanism. The operation of the device after the placing of an address in the selector proceeds automatically with rotation of the drum store, selection and partial withdrawal of an addressed item at the selector, stopping of the drum with the selected item at the delivery station, and indexing of the selected item in the station and separation of adjacent items from the selected item. Return of an item into the drum store by the X–Y manipulating mechanism effects automatic withdrawal of the item-separating mechanism and rotation of the drum to select a newly-addressed card to repeat the operation.

For ease in terminology in describing the present invention, the items to be stored will be referred to generally as "cards," which term is intended to cover many different types of items including, without limitation, ledger cards, magnetic cards, optical cards, punch cards, tapes, keys, slides, film cards, microfiche, microfilm jackets, and the like, one specific example being a transparent sheet "card" carrying as many as one hundred or more individual film images or the like.

The storage of cards in devices according to the present invention may be in random positions, the cards themselves being provided with identification means which permits them to be individually selected and recalled as desired, independently of their positions and the order in which they are stored. It will therefore be clear that in such an embodiment the cards need not be placed in any particular position in the store, either when first filed or when returned to the store after recall into a delivery position. Thus all of a group of cards may be enfiled in the store at the same point and stored in random order, with the individual cards individually addressed for selection and recall. The position of a card in the store need not be identified as its order can be entirely random and the cards selected by their individual identifications rather than their physical positions.

The present invention relates to the storage, selection and recall of a card into a delivery station whence it can be removed from the store, or from which a mechanism may move it into a position locating a particular film image on the card in an optical projection path or the like. The movements of the card after it has been selected and placed at the delivery station form no part of the present invention and may be accomplished by known translating and locating mechanisms which will be referred to hereinafter as X–Y mechanisms. Any such X–Y mechanism may be associated with the device of the present invention to control the withdrawal, locating and return of a card after it has been selected and placed in the delivery station of the storage and retrieval device of the present invention.

In a preferred embodiment of the invention selected for illustration herein, the identification of the individual cards is by means of notches at their forward edges, which notches may be located according to any desired code, such as standard binary, binary coded decimal, grey binary, octal and like codes which permit each individual card to be addressed by its identifying number and retrieved from a random storage position.

The basic selector mechanism according to the present invention is relatively independent of the size of the store which may vary from small portable units through commercial devices to large library storage. Likewise the invention is applicable for use with a common storage area or where the store is divided into a plurality of individual magazines with which the cards are identified and associated.

While the store and selector may be moved relatively rectilinearly according to this invention, in the embodiment selected for illustration herein the store is conveniently contained in a drum which rotates the cards past a selector which contains the address of an individual card which it is desired to recall. The selector automatically separates the addressed card from the other cards in the drum by pulling it radially outwardly from the store and when the addressed and selected card passes a sensor device, rotation of the drum is terminated with the selected card substantially in the delivery position. Additional mechanism is then actuated to finally index or center the selected card and, if desired, to separate the adjacent cards therefrom for easy removal and return of the selected card with respect to the other cards in store.

In the illustrated embodiment, the cards are identified by notches in their front edges, arranged according to a selected code, such as standard binary, to provide one and only one combination of notches for each card in the store or in each magazine in the store. The cards are selected by means of address plates which are movable to be positioned according to the same coding used in the card notches, for example the address plates may each have two positions, one corresponding to a binary zero and the other to a binary one.

The cards and the address plates are then moved relative to each other, in the embodiment illustrated by rotating a drum containing the cards parallel to the edges of the address plates and the notches in the single card addressed by the address plates receive the plate edges so that that card may move forwardly of its storage position. In the illustrated embodiment, this forward motion is accomplished by means of permanent magnet poles at the selector which are non-concentric with the circumference of the drum and to which the cards are attracted by magnetic material mounted on the forward edges of the cards, at least opposite the magnet poles. For convenience the magnetic material may extend the full height of the card by being cemented thereto or crimped thereon and may have the coding notches identifying the card cut therein.

The address plates may be operated into their addressing positions by any desired means, a convenient one shown in the drawings being by spring-return solenoids.

Another feature of the illustrated embodiment lies in the mechanism for finally indexing the selected card in its delivery position and moving the adjacent cards away from the selected card to facilitate its withdrawal and insertion by an X–Y mechanism.

It is therefore an object of the present invention to provide an improved random access storage and retrieval device for a multiplicity of individually identified cards.

Another object of this invention is the provision of an improved card storage and retrieval device which is simple, inexpensive and reliable and which provides for the selection of individual cards from a large number which may be stored in random positions.

Another object of this invention is the provision of a random access card storage and retrieval device having an improved selector mechanism for identifying and moving relative to the store a particular card to be recalled therefrom.

A further object of this invention is the provision of an improved random access card storage and retrieval device including improved card selecting, selected card sensing, and selected card indexing mechanisms.

A still further object of this invention is the provision of an improved card identifying and selecting means for a random access card storage and retrieval device.

Another object of this invention is the provision of an improved indexing and presenting means for a selected card in a storage and retrieval device.

These and other objects and features of the invention will be apparent to those skilled in the art from the following specification and the appended drawings in which.

Figure 8:
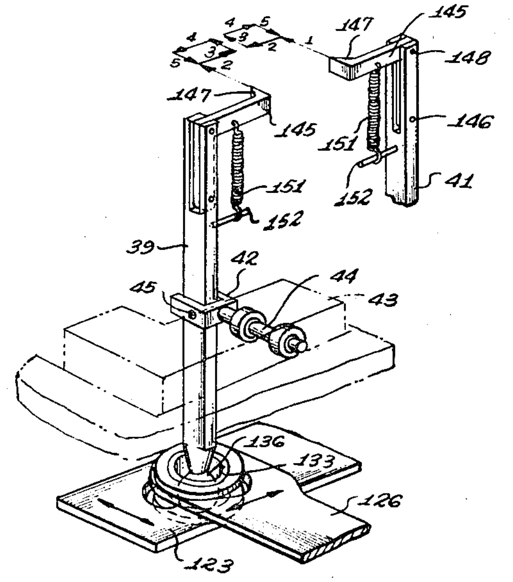
FIGURE 8 is a partially perspective, partially diagrammatic showing of the indexing and separating movements of mechanism elements at the delivery station, including card-indexing and card-separating wedge-like fingers.
Figure 8A:
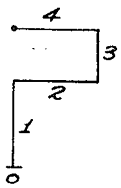
Figure 14:
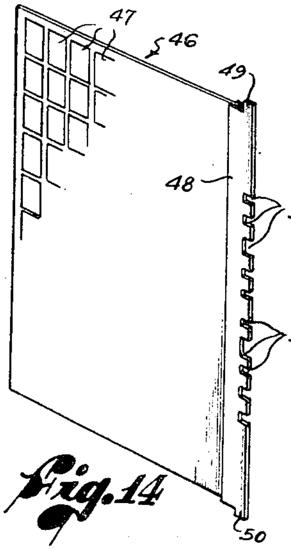
Figure 16:
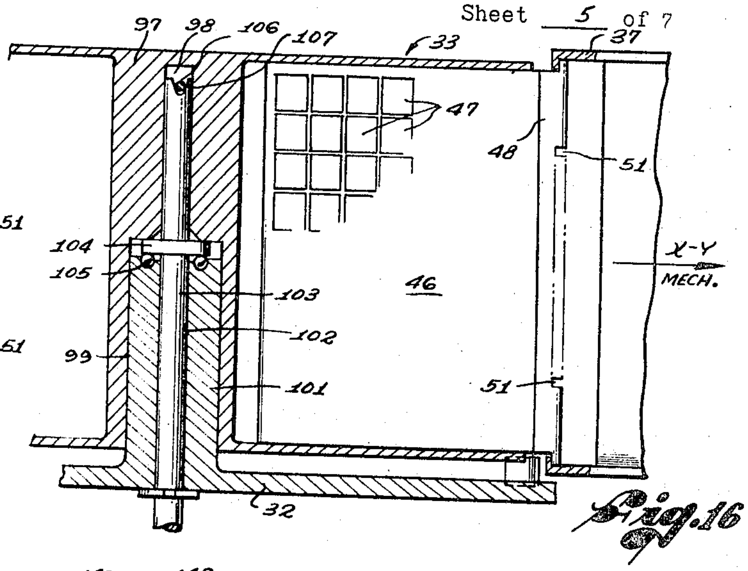
Figures 15, 17, 18, 19, 20:
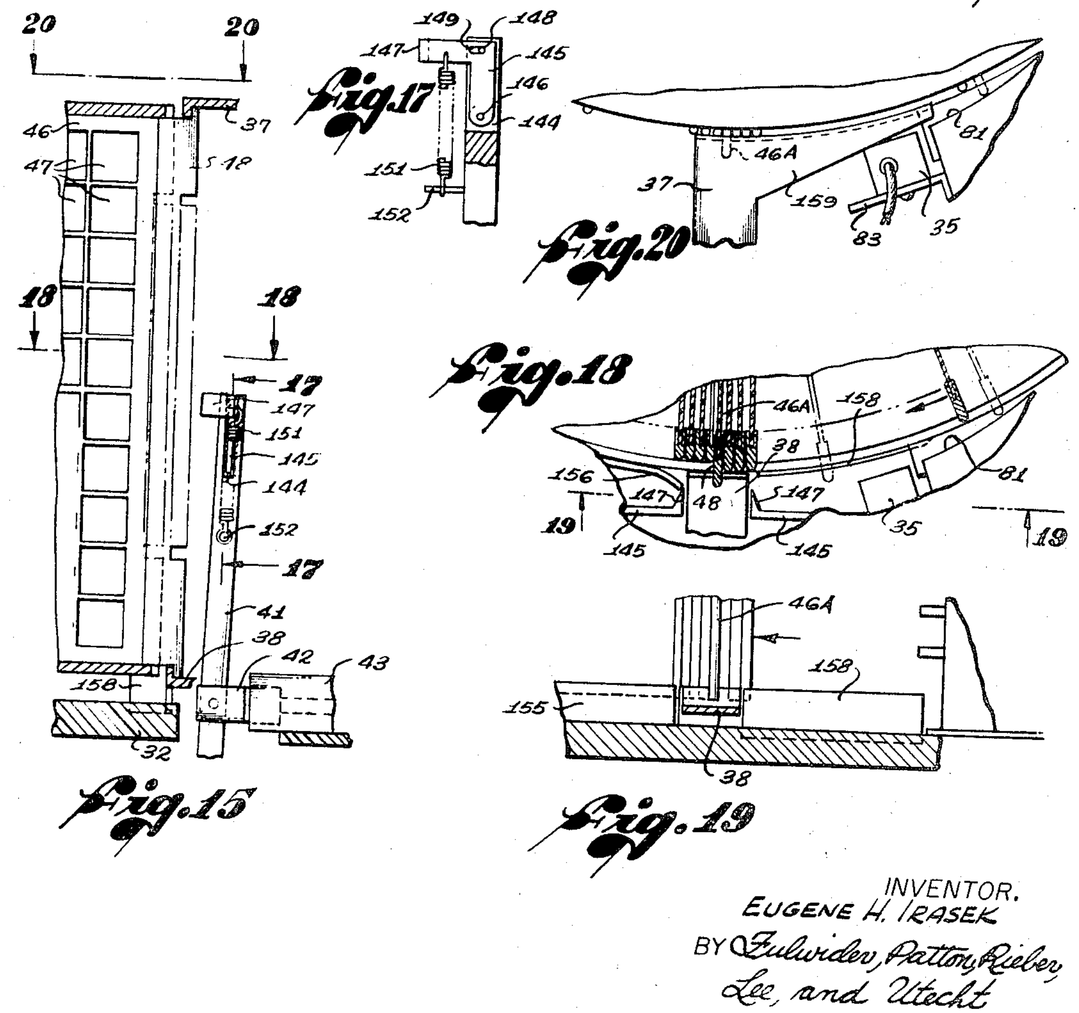
Figure 21:
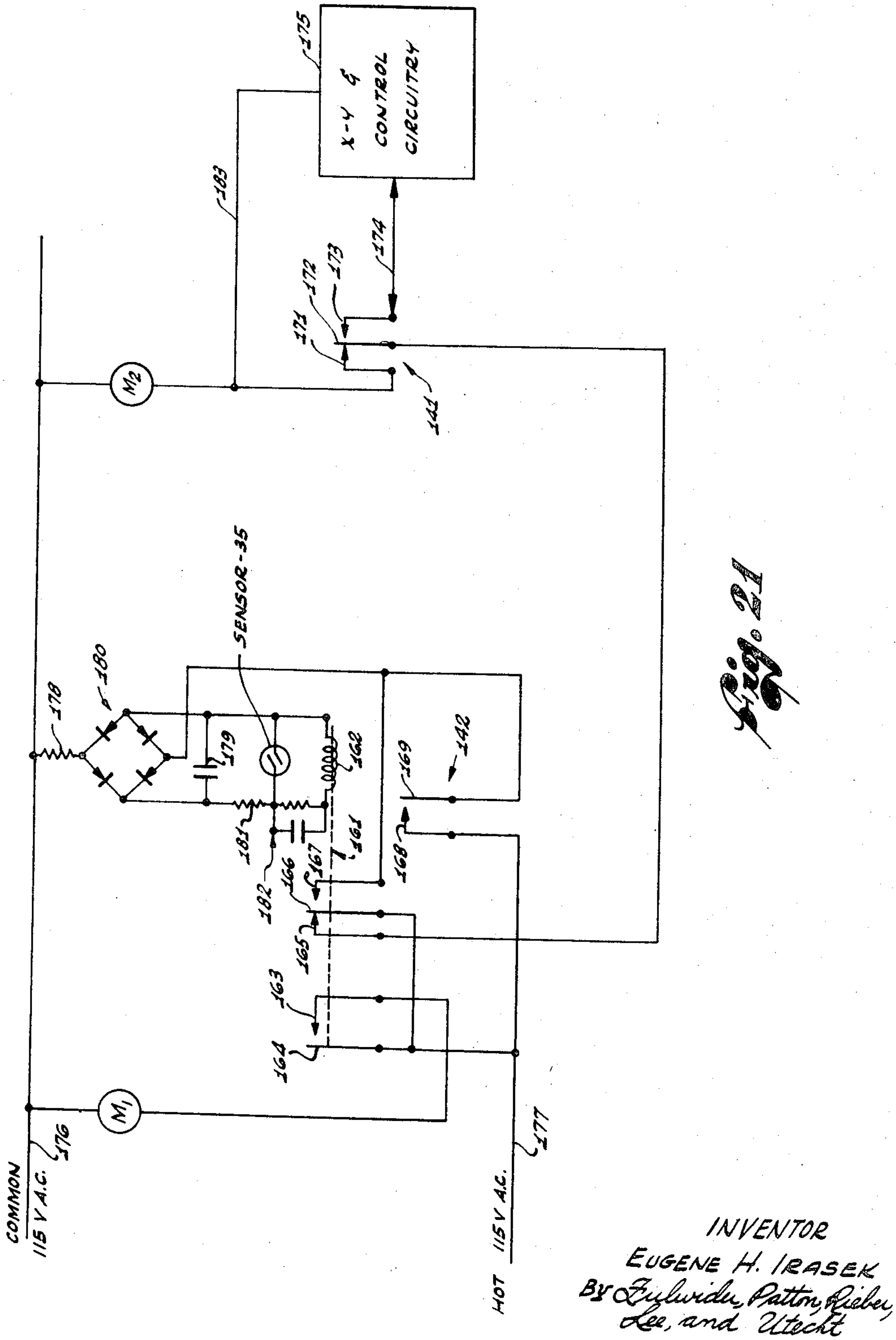
Figure 22:
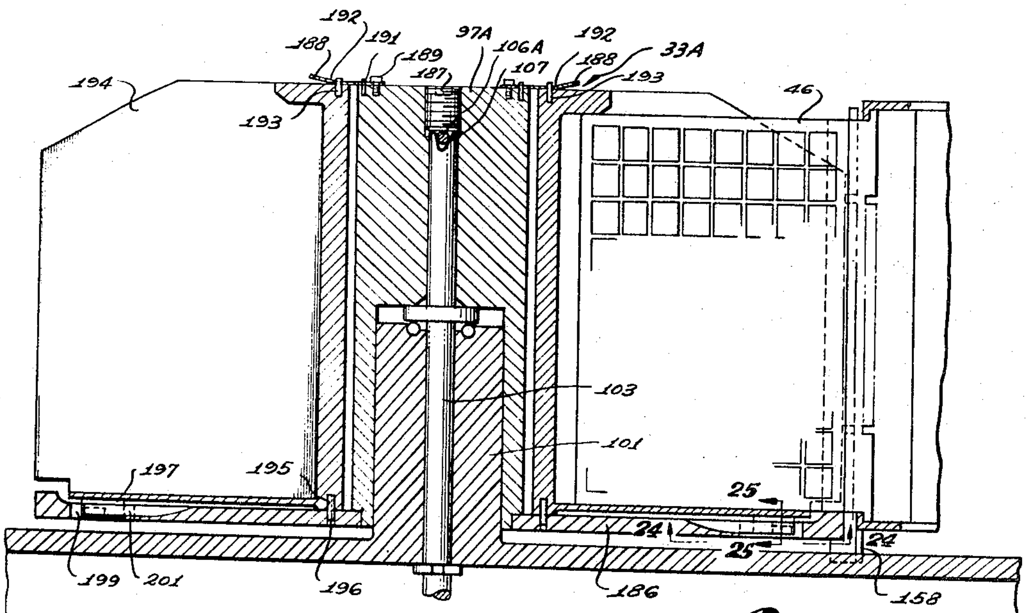
Figure 23:
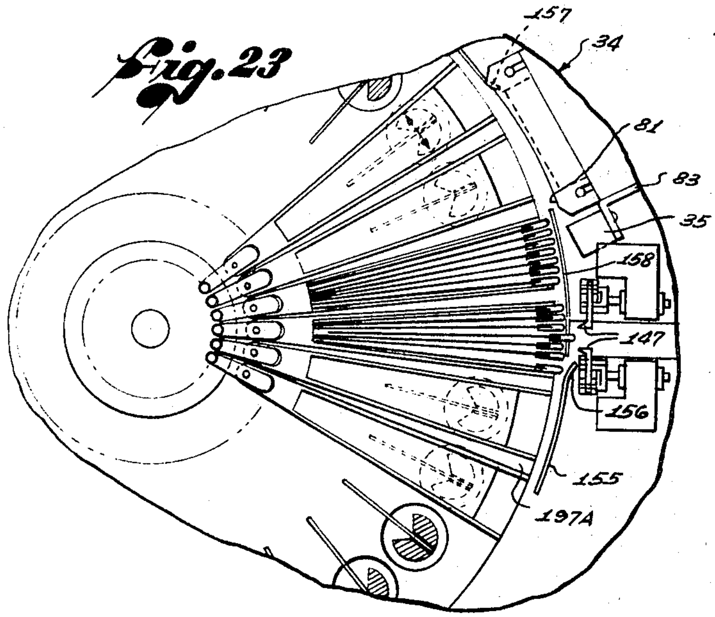
Figure 24:
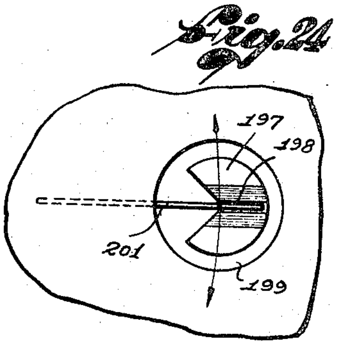
Figure 25:
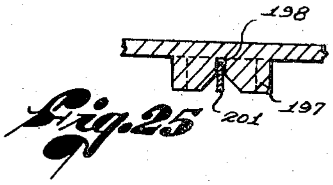

FIGURE 8*a* is a representation of an alternate path of movement in which the return retraces the operational paths;

FIGURES 9 through 13 diagrammatically illustrate the various positions of the card-manipulating, wedge-like projections whose paths are indicated in FIGURE 8;

FIGURE 14 is a perspective view of one type of card which may be stored for recall in the device according to the present invention;

FIGURE 15 is a detailed vertical sectional view showing a selected card at the delivery station before operation of the indexing mechanism;

FIGURE 16 is a diametrical vertical sectional view through the storage drum at the delivery station;

FIGURE 17 is a detailed sectional view on the line 17—17 of FIGURE 15;

FIGURE 18 is a generally diagrammatic, partially horizontal sectional view showing the relative positions of selector, sensor and indexing mechanisms and the delivery station;

FIGURE 19 is a detailed vertical sectional view at the line 19—19 of FIGURE 18;

FIGURE 20 is a detailed plan view above the section of FIGURE 18;

FIGURE 21 is a simplified wiring diagram for the drum driving and card indexing mechanisms of the device according to the present invention;

FIGURE 22 is a diametrical vertical sectional view similar to FIGURE 16 of a modfied form of storage drum using magazine storage for the cards;

FIGURE 23 is a partial plan view of the magazine storage drum of FIGURE 22;

FIGURE 24 is a detailed bottom plan view at the line 24—24 of FIGURE 22; and FIGURE 25 is a detailed sectional view at the line 25—25 of FIGURE 22.

In the embdiment illustrated in FIGURES 1 through 21, the card storage and retrieval device according to the present invention may include a cabinet or box-like structure 31 having a removable cover 32 upon which is rotatably mounted a card storage drum 33. Also mounted on the cover 32 are a card selector 34 having a card sensor 35 adjustably mounted thereon. A delivery station at 36 has upper and lower X–Y mechanism parts 37, 38 shown thereat.

A pair of card indexing and card separating arms 39 and 41 are pivotally mounted in holders 42 on pins 45. The holders 42 are rigidly mounted on shafts 44 which are rotatably mounted in stationary blocks 43 carried on the cover 32.

An X–Y positioning mechanism which may be used to withdraw and return a selected card at the delivery station forms no part of the present invention and only the card engaginging parts 37, 38 have been shown in the drawings. It will be understood that any X–Y card manipulating mechanism may be used with the storage and retrieval device according to the present invention.

One example only of a card useable in the device according to the present invention is shown in FIGURE 14 at 46 of rectangular configuration of, for example, transparent plastic sheets between which are mounted a plurality of individual film chips 47. Upon the forward edge of the card 46 is cemented or crimped a magnetic strip 48 having upper and lower extensions 49 and 50. The forward edge of the strip 48 is provided with notches 51 in any desired code by which each card 46 may be uniquely identified and which cooperate with address plates at the selector to select and recall a desired card. The card 46 could also be a single film sheet with multiple images directly thereon and the coding notches placed in the forward edge of the film sheet itself. In this case the magnetic material could be in the form of two separate pieces, above and below the coding notches and cemented, taped or crimped to the film sheet. Also, the notches and magnetic pieces could be in a plastic strip which is attached to the edge of the film sheet. As stated before, the notches may be in any desired code such as standard binary, binary coded decimal, grey binary, octal, and like codes of which a more detailed description is given in my copending application, Ser. No. 378,681, filed June 29, 1964 for Random Access Storage and Retrieval Device, now Patent No. 3,313,055, granted Apr. 11, 1967.

Figure 1:
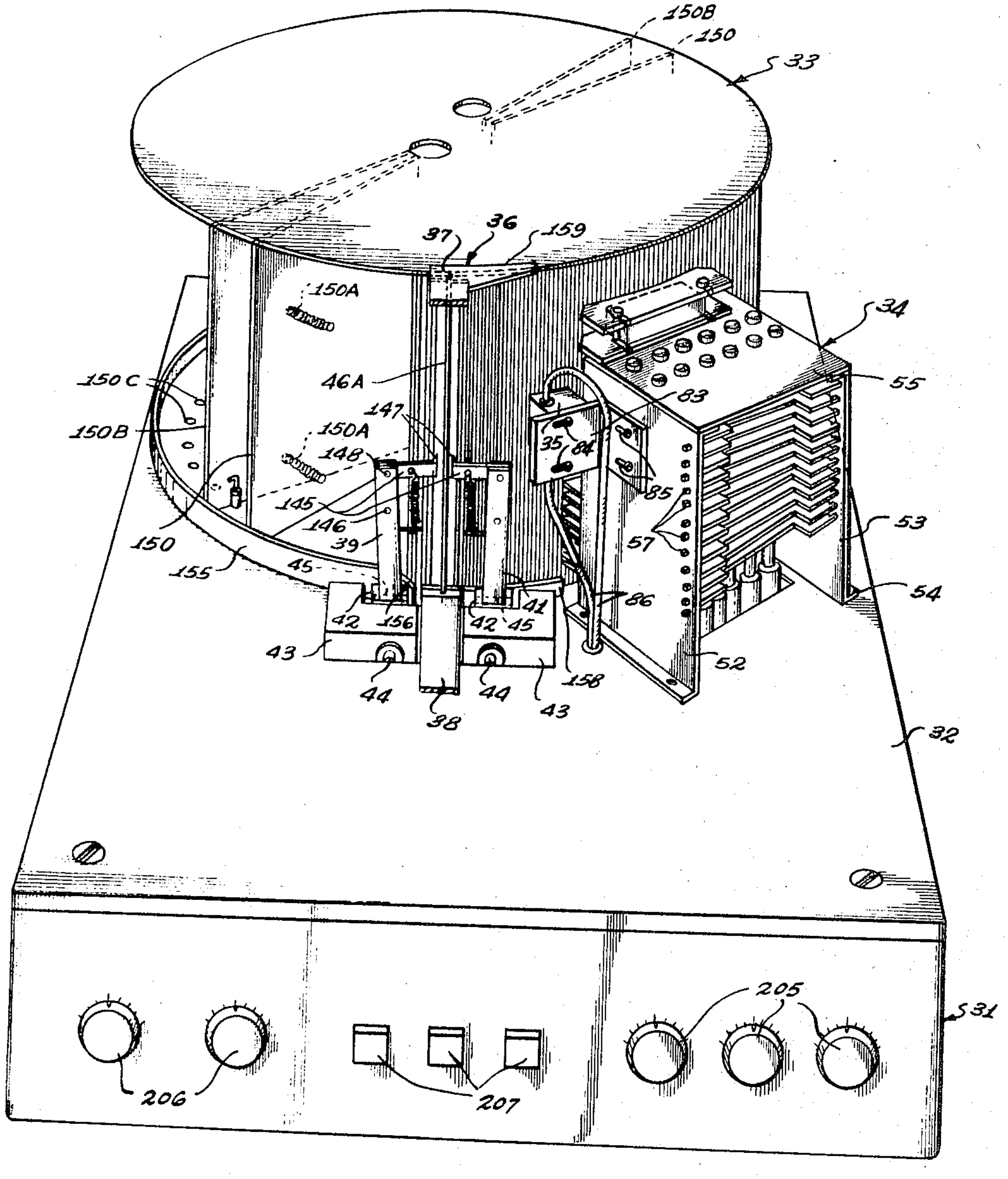
FIGURE 1 is a generally perspective view, with the X–Y mechanism removed, of a random access card storage and retrieval device according to the present invention.
Figures 2, 3:
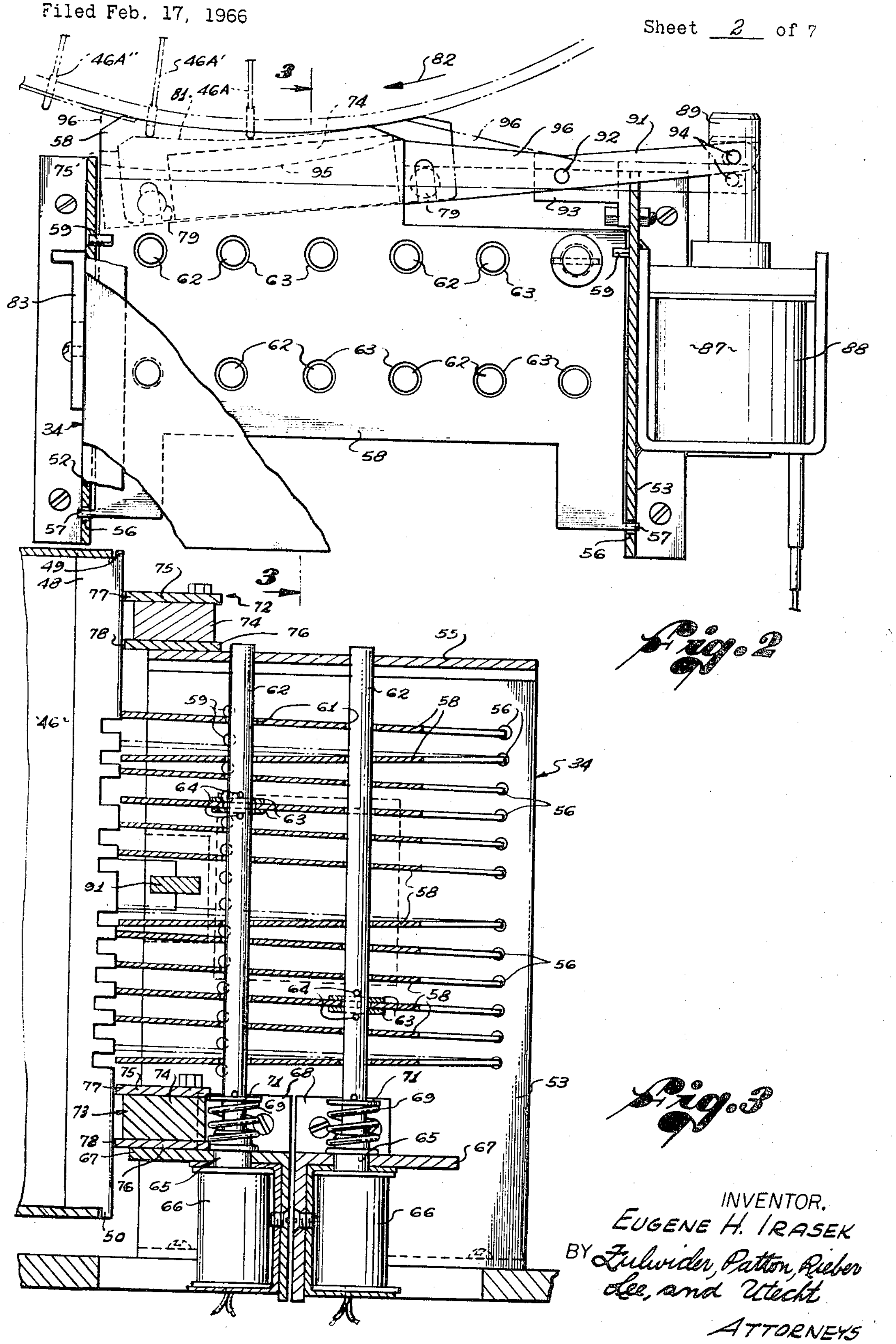
FIGURE 2 is a plan view, with a portion of the top broken away, of a card addressing and selecting means according to the present invention.
FIGURE 3 is a vertical sectional view on the line 3—3 of FIGURE 2.

The selector 34 is more particularly illustrated in FIGURES 1, 2 and 3 as comprising side plates 52 and 53 flanged outwardly at their bottoms 54 and bolted to the top of the cover 32. The upper ends of the side plates 52 and 53 are flanged inwardly and have attached thereto a top plate 55. Adjacent the edges of the side plates 52, 53 remote from the drum 33 are a plurality of vertically aligned and spaced mounting holes 56 into which project fingers 57 at the rear opposite side edges of address plates 58 to thereby mount the plates 58 for rotation within the selector. A plurality of vertically aligned and spaced pins 59 are mounted on and extend inwardly from the side plates 52 and 53 to limit the opposite extreme positions of the address plate 58, as shown more particularly in FIGURE 3. The opposite extreme positions of the plates 58 may, for example, correspond to the binary numbers 0 and 1 in the coded identification of the cards 46.

The address plates 58 are provided with vertically aligned clearance holes 61 through which extend operating rods 62 having their upper ends extending through and guided by the top plate 55 of the selector. The rods 62 are twelve in number in the embodiment illustrated, and are each connected to one only of the twelve address plates 58 shown. Thus, the right-hand rod 62 shown in FIGURE 3 is connected to the third address plate 58 from the bottom by means of a pair of washers 63 held by transverse pins 64 through the rod. Likewise, the operating rod 62 to the left in FIGURE 3 is connected to the fourth address plate 58 from the top, also by washers 63 and pins 64.

The lower ends of the operating rods 62 are secured to individual solenoid armatures 65 which are moved downwardly by solenoid operating coils 66. The solenoids are mounted on brackets 67 which extend between the side plates 52, 53 and are supported thereon by upstanding flanges 68. Compression springs 69, between the brackets 67 and washers 71 on the operating rods 62, bias the rods into their uppermost positions shown in FIGURE 3.

Upon the top plate 55 and the bracket 67 adjacent the drum 33, are mounted magnet structures 72 and 73, respectively. Each magnet structure includes a central permanent magnet bar 74, of ceramic magnet material, Alnico-5 or the like, to the opposite pole faces of which are secured pole plates 75, 76 of magnetic material presenting opposite poles faces 77, 78 to the forward edges of the magnetic strips 48 on the cards 46. The pole plates 75, 76 and permanent magnet bars 74 are adjustably mounted on the top plate 55 and bracket 67 by bolts 79 extending through slots in the pole plates. Instead of the permanent magnet bars 74, it is obvious that electromagnet cores and energizing coils could be utilized to magnetize the pole plates 75, 76.

The pole faces 77 and 78 are non-concentric with the circumference of the drum 33, as shown by the dotted line 81 in FIGURE 2 and the corresponding full line 81 of FIGURES 18, 20 and 23. Thus, the portions of the pole faces 77, 78 first approached by the magnetic strips 48 on the cards 46 lie closely adjacent the drum periphery but the pole faces where the cards leave the selector are spaced from the drum periphery to withdraw the selected card a short distance radially from the drum. This operation is indicated in FIGURE 2 by the three positions of the dotted selected card 46A which has been addressed in the selector. As the drum 33 rotates in the direction of the arrow 82 the addressed card 46A has notches 51 in its forward edge corresponding to the positions of the adjacent edges of the address plates 58 so that the card 46A assumes, successively, the positions 46A′ and 46A″ as it is rotated through and beyond the selector.

As shown in FIGURE 3, the address plates 58 are so positioned that they do not address the card 46 shown therewith which is therefore prevented from following the pole faces 77, 78 by the engagement of its forward edge with the edges of several of the address plates 58.

The sensor 35 is mounted on a generally L-shaped bracket 83 so that it may be adjusted tangentially to the drum 33 by the slot mounting at 84 and substantially radially with respect to the drum by the slot mounting at 85. The sensor may take any form, for example, a magnetic reed switch and permanent magnet arrangement by which the reed switch may close a circuit 86 upon the approach of the magnetic edge of a selected and withdrawn card into the position 46A″. When a selected and partially withdrawn card is so sensed by the sensor 35 the circuit 86 is used to deenergize the motor rotating the drum 33, causing it to stop with the selected card 46A at the delivery station 36, as shown in FIGURE 1.

A solenoid operator 87 is mounted on the outside of the plate 53 and its coil 88, when energized, attracts an armature 89 inwardly to the dotted line position shown in FIGURE 2, the armature 89 being normally biased outwardly into its full line position. An arm 91 is pivotally mounted at 92 on a bracket 93 bolted to the side plate 53. The arm 91 is connected to the armature 89 by a pin and slot connection at 94 and at its opposite end has a curved face 95 which is moved into engagement with the forward edges of the cards 46, as shown in phantom at 96. The arm 95, when so engaging the edges of the cards 46, prevents them from being pulled outwardly by the magnet structures 72 and 73 while the addressing plates 58 are moving to new address positions. The solenoid operator 87 is therefore energized to hold the cards against withdrawal each time that the address in the selector 34 is changed by moving the address plates 58.

As shown in FIGURE 16, the drum 33 has a central hub 97 with a central bore 98 provided with a large counterbore 99 at the bottom. A post 101 which may be integral with the cover 32 has a central bore 102 therethrough. An operating shaft 103 extends through the bore 102 and is connected to be rotated by a motor $M_1$ in the cabinet 31. The shaft 103 has a collar 104 thereon which is supported by means of thrust bearing balls 105 upon the end of the post 101. A pin 106 spans the bore 98 in the drum hub 97 and is received within a notch 107 in the end of the drive shaft 103. The drum 33 is thereby supported on the collar 104 which is in turn supported on the post 101, and the drum is rotated with the shaft 103 through the engagement of the pin 106 in the slot 107.

Reference is now made to the card-indexing and cards-separating mechanism which is operated by a motor $M_2$ driving a shaft 108 having a head 109 to which are pinned at 110, cam plates 111, 112, 113 and 114. Since the cam plates 111–114 all rotate together it is obvious that they can be unitary, with the cam surfaces molded or cut on a single piece. A supporting plate 115 is suspended from the under surface of the cover 32, as by posts 116, and on the top surface of the plate 115 is slidably mounted a strip 117 for rectilinear only movement guided by plates 118 adjacent its opposite ends. A tension spring 119 interconnects a pin 121 on the strip 117 and a stationary pin 122 to bias the strip 117 toward the right as viewed in FIGURES 4 and 6. A cross-piece 123 is rigidly secured to the strip 117, as by rivets 124.

A pair of arms 125 and 126 are pivoted at one end at 127 and 128, respectively, to the plate 115. The opposite ends of the arms 125, 126 are provided with longitudinal slots 129 and 130, respectively. The ends of the cross-piece 123 are provided with slots 131 and 132 whose axes are aligned with the cross-piece and generally at right angles to the axes of the slots 129, 130. Headed bushings 133, 134 extend through the mated slots 129, 131 and 130, 132, respectively. The bushings 133, 134 have openings 135 therein in which are received the ball-like lower ends 136 on the universally pivoted arms 39, 41. The bushings 133, 134 may be of any desired material, for example, molded or machined nylon to be readily slidable in the slots 129–132.

The cam surface on the edge of cam plate 111 engages the edge of the cross-piece 123. The cam edge of the plate 112 engages the edge of the pivoted arm 125, and the cam edge of the plate 113 engages the edge of the plate 137 rigidly mounted on the pivoted arm 126. The arms 125, 126 are biased against their respective cam surfaces by the interconnecting spring 138. A bracket 139 is mounted on the plate 115 and supports a pair of switches 141 and 142 operated in that order by a cam projection 143 on plate 114, as shown more particularly in the representation of FIGURE 7.

The upper ends of the arms 39 and 41 are slotted, as shown more particularly at 144 in FIGURE 17, to receive L-shaped members 145 pivoted at 146 within the slots and having wedge-shaped projections 147 at their free ends. A pin 148 spans each slot 144, passing through a slot 149 in each member 145 to limit its rotation about pivot 146. Tension springs 151 interconnect the members 145 with fixed pins 152 to bias the members 145 in a counter-clockwise direction as viewed in FIGURE 17, that is the horizontal arm downwardly as viewed in FIGURE 8.

The cards 46 are placed in the drum 33 between spaced, biased plates 150, shown in FIGURE 1. The plates 150 are biased by springs 150A away from rigidly mounted plates 150B. One set of plates and springs 150, 150A, 150B is movable around the drum to different positions in which the plate 150B is indexed, as by a pin thereon entering any of a plurality of openings 150C in the bottom of the drum. This provides space for the particular number of cards in the drum at any one time. For a full drum, the plates 150B are side by side and the plates 150 biased oppositely therefrom. This arrangement not only provides a loose cooperation between the cards while holding them erect, but also insures that each selected card will be stopped adjacent the center of the delivery station 36 regardless of its position in the store. In the larger arc between the delivery station 36 and the selector 34 the cards will be maintained in the drum by a circular flange 155 which may be brazed in a notch or otherwise suitably mounted on the cover 32. The cards are pressed back into the drum after return into the delivery station by the X–Y mechanism by rotation of the drum whereby the card edges engage the flaring end 156 on the flange 155. The flange 155 ends at the selector 34 as shown at 157 in FIGURE 23, but all but the addressed cards are held back in the drum by the edges of the address plates 58. At the downstream end of the selector 34 another, short arcuate flange 158 holds the non-selected cards in the drum while the bottom finger projection 50 on the selected card moves on the outside of the flange 158 and thereafter into engagement with the part 38 on the X–Y mechanism. The top projecting finger 49 on the selected card moves into engagement with the extended arcuate arm 159 on the upper X–Y mechanism part 37.

Figure 9:
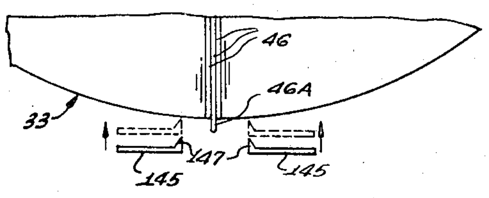
Figure 10:
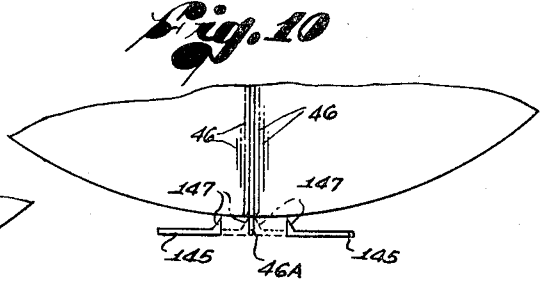
Figure 12:
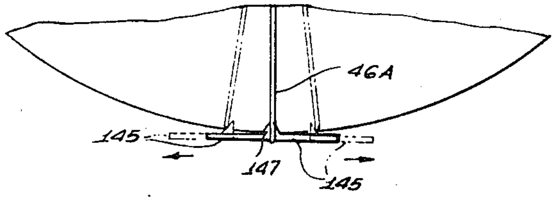

The movements of the wedge projections 147 in card-indexing and cards-separating are shown in FIGURES 8 through 13 and are effected when the ball ends 136 of the arms 39 and 41 are moved by the bushings 133, 134 in the slots 129–132. The successive movements are numbered in FIGURE 8 and are in the direction of the arrows from the full to the dotted line positions in FIGURES 9–13. FIGURES 8 and 9 show the positions of the arms 39, 41 and the wedge projections 147 when a card 46A is first placed in the delivery station 36 by drum 33 which stops to response to deenergization of its drive motor $M_1$ by the circuit controlled by sensor 35.

The motor $M_2$ is then energized and rotates cam plates 111–114. Cam plate 111 first effects movement of the cross-piece 123 rectilinearly under the bias of spring 119. This rotates the arms 39 and 41 about the pivots 145 and moves the wedges 147 toward but out of contact with the cards in the drum 33. Continuing rotation separates the arms 125, 126 by the cam plates 112, 113 to move the wedges 147 toward each other into the dotted line position of FIGURE 10 to positively index or center the selected card 46A in its final delivered position with respect to the X–Y mechanism.

Figure 11:
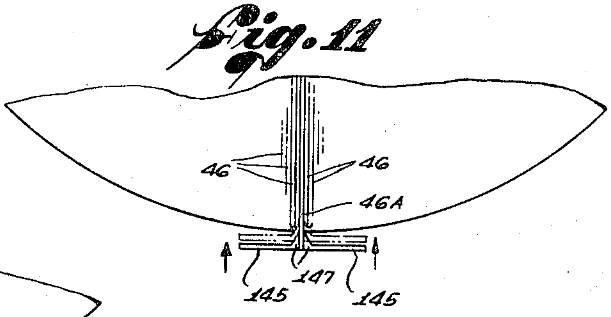

As the motor $M_2$ continues to rotate, the cross-piece 23 again moves rectilinearly to move the wedges 147 inwardly past the edges of the drum cards 46 into the dotted line position of FIGURE 11. Continued rotation of the motor M now permits arms 125 and 126 to move toward each other under the bias of spring 138 and this moves the wedges 147 apart into the dotted line position of FIGURE 12, thus moving the other cards away from the selected card 46A. The X–Y mechanism now operates, as indicated by the arrow in FIGURE 13, to manipulate the card 46A in any manner desired and in accordance with the particular mechanism selected for use with the device of this invention.

Figure 13:
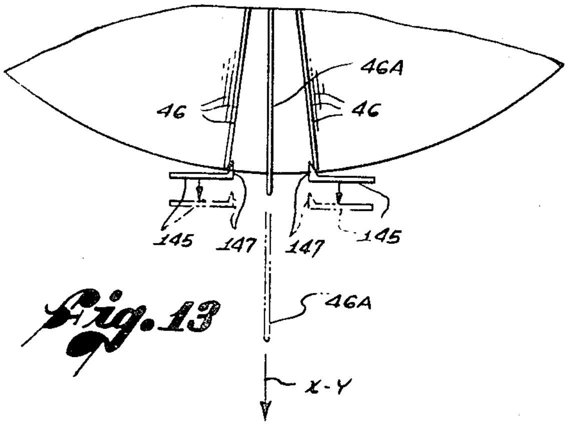

The cards remain separated as in FIGURE 13 until the X–Y mechanism returns the card 46A to its position there shown, whereupon the motor $M_2$ is again energized and the cross-piece 123 moves rectilinearly to move the wedges 147 back to their original position of FIGURES 8 and 9, and as shown in dotted lines in FIGURE 13. Motor $M_2$ is deenergized and motor $M_1$ energized to rotate the drum 33 whereupon the edge of card 46A engages the flared end 156 of the flange 155 and is returned into the drum store.

As can be seen from an inspection of the numbered movements of FIGURE 8, the wedges 147 traverse a path of the general configuration of a closed letter P in final indexing the selected card and separating the other cards therefrom, and returning to the original position. Alternatively, the path traversed can be like an open letter P, as indicated in FIGURE 8*a* where the motions of the wedge 147 on the arm 41 are numbered but do not include the straight line return movement 5 of FIGURE 8 which closes the P. Instead, in the operation according to FIGURE 8*a*, the wedges 147 will reverse the paths they took to reach the full line position of FIGURE 13 and this can be accomplished in any one of a variety of ways, for example, by simply reversing the rotation of motor $M_2$, by using a rotary solenoid with a spring return instead of the motor $M_2$, or by a clutch connection to motor $M_2$ with a similar spring return. Whether the closed P path of FIGURE 8 or the open P path of FIGURE 8*a* is used, the same result is accomplished of card-indexing and cards-separating as shown in FIGURES 9–12.

A simplified wiring diagram for the $M_1$ and $M_2$ motors driving the storage drum and the card-indexing and cards-separating mechanism is shown in FIGURE 21. The A.C. motors $M_1$ and $M_2$ are desirably provided with internal magnetic or frictional brakes to controllably stop their rotation when deenergized. A D.C. relay 161 has an operating coil 162, normally-open contacts 163, 164, and double-throw contacts, movable 166, normally-closed 165 and normally-open 167. The switch 142 has normally open contacts at 168, 169 and the switch 141 has double-throw contacts, movable 172, normally-closed 171 and normally-open 173. The contact 173 is connected, as indicated by the logic line 174, to general control circuitry and the X–Y mechanism control indicated in the block 175 and the specific elements of which form no part of the present invention. It will be understood that all energizations and deenergizations not shown in FIGURE 21 can, for example, be taken care of by manual switches, particularly for the energization of the solenoids 66 at rotary switches 205 and the identification of the X–Y location of the film chip desired at the rotary switches 206. The coil 88 of solenoid 87 may likewise be manually energized at one of the switches 207 or through a control sequence panel whose electrical components and connections are within the ordinary electrician's skill.

The operating coil 162 of relay 161 is fed by a rectifier bridge 180 from the A.C. lines 176, 177 through the contacts 168, 169 of switch 142, or holding contacts 166, 167. In series with the bridge is a current limiting and voltage dropping resistor 178. A filtering capacitor 179 is placed across the bridge output which feeds the coil 162 through another voltage dropping resistor 181 and a parallel resistor-capacitor combination 182 which insures rapid pull in and drop out of the relay 161. The sensor 35 contacts are shown connected across the coil 162 and RC combination 182 so that closing of the sensor contacts bypasses the coil 62, causing the relay 161 to quickly drop out. Contacts 168, 169 of switch 142 are momentary contacts which open a short time after they are closed. After operation the contact 173 of switch 141 remains closed and contact 171 opens to deenergize the motor $M_2$ util it is reenergized by a momentary contact line 183 closed by the control circuitry in 175 when a card is returned to the drum by the X–Y mechanism.

In the operation of the device according to the present invention, with switch 141 operated to open 171 and close 173, motors $M_1$, $M_2$ and coil 162 are deenergized and further control is placed in the circuitry in 175 and the X–Y mechanism operates to move the selected card as desired. During this period the solenoid 87 may be operated to move the arm 91 into card holding position and a new address of a new card to be selected is placed on the address plates 58 by energization and deenergization of the proper solenoids 66 as, for example, by manipulation of rotary switches 205 similar to those described in my aforementioned copending application. Similar rotary switches 206 may be used to identify the film chip on the card and control the X–Y mechanism, and any desired number of manual switches 207 may be provided to effect operations as desired, including start, stop, power, and solenoid coil 88 energization.

Figure 4:
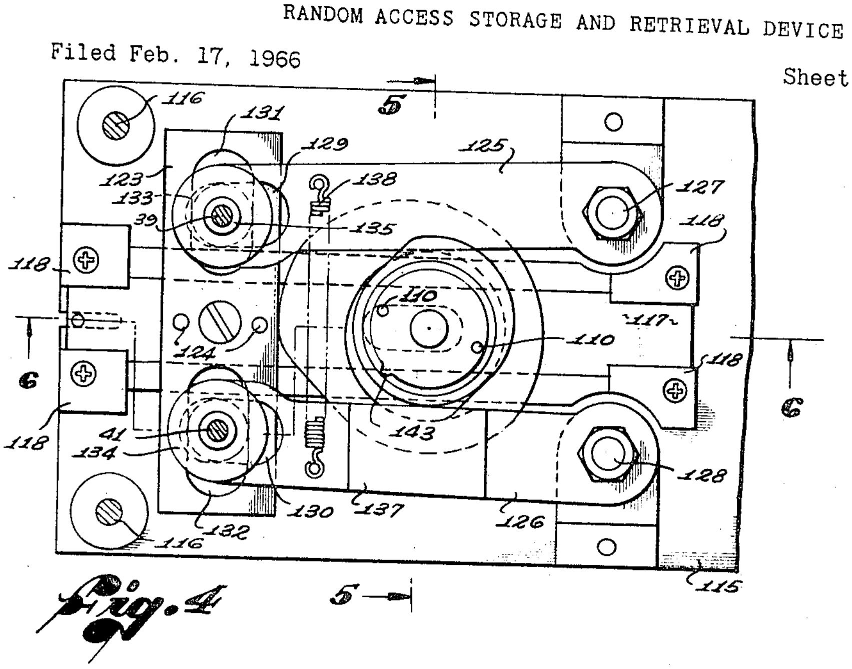
FIGURE 4 is a generally horizontal sectional view on the irregular line 4—4 of FIGURE 6 showing the operating mechanism for the indexing and separating mechanism at the delivery station.

As the X–Y mechanism returns a selected card 46A back into the drum at the delivery station, that is, into the position of FIGURE 13, line 183 will be momentarily closed to connect motor $M_2$ across lines 176, 177 through closed contact 173. As the motor $M_2$ rotates, projection 143 on cam plate 114 leaves switch 141 so contact 171 closes and energizes the motor $M_2$ therethrough and through normally-closed contact 165 of relay 161. As the motor $M_2$ continues to rotate the shaft 108, cam plate 111 moves the cross-piece 123 to its furthest position to the left as shown in FIGURES 4, 6 and 7, thereby moving the card-manipulating wedge projections 147 away from the storage drum into the position shown in dotted lines in FIGURE 13.

Figures 5, 6, 7:
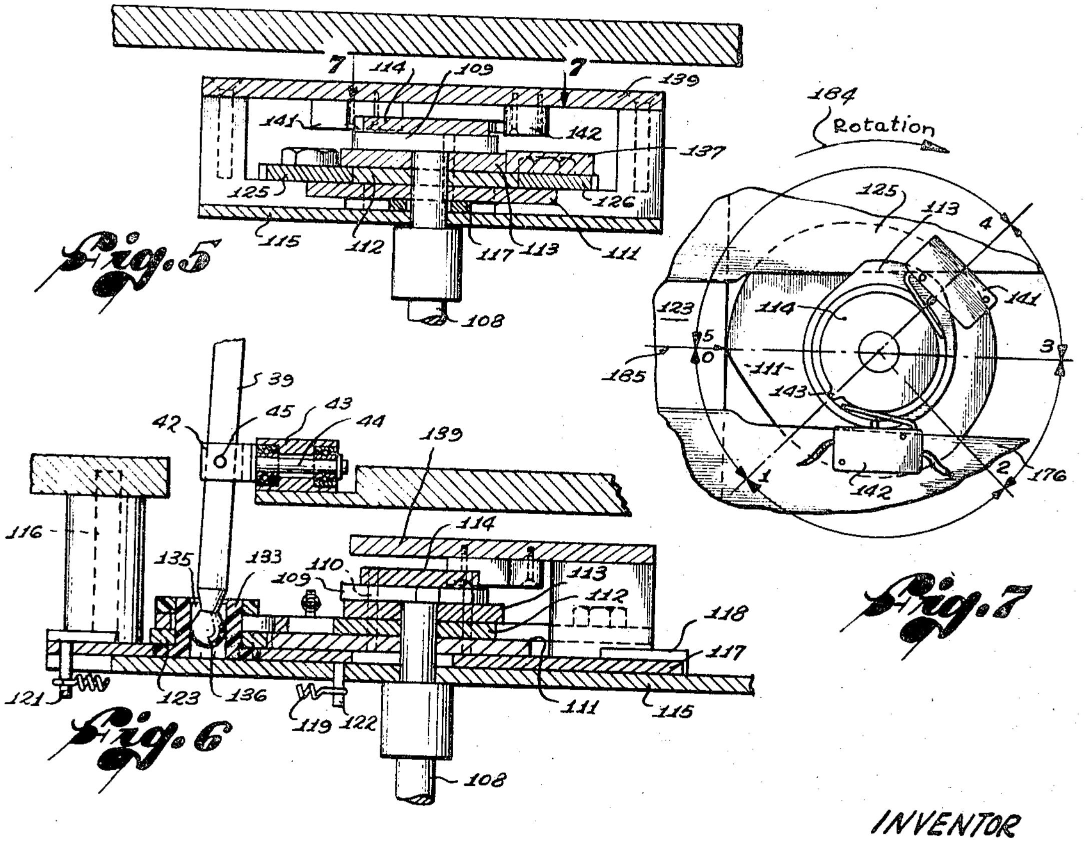
FIGURE 5 is a vertical sectional view on the line 5—5 of FIGURE 4.
FIGURE 6 is a vertical sectional view on the line 6—6 of FIGURE 4.
FIGURE 7 is a generally diagrammatic view showing cam sector and switch operation for the mechanism of FIGURES 4–6.

Referring to FIGURE 7, rotation of motor $M_2$ and the cams 111–114 rotating therewith is in the direction of the arrow 184. As the projection 143 moves past the operator of the switch 142, it momentarily closes contacts 168, 169 to energize the rectifier bridge 180 whose output energizes the relay coil 162 to operate relay 161, closing contacts 163 and 167 and opening contact 165. Opening contact 165 deenergizes motor $M_2$ which controllably brakes to a stop with the cams in the positions shown in FIGURE 7. The card-manipulating wedges 147 are now in the dotted line position of FIGURE 13 and as shown in FIGURE 8. Closing of contact 167 places a holding circuit for the relay coil 162 about the switch 142, the rectifier bridge 180 being energized through contacts 166, 167 to the line 177.

Upon closing of contacts 163, 164, motor $M_1$ is energized and drum 33 rotates to present the cards 46 to the selector 34 until such time as a card addressed by the plates 58 passes through the selector position, is pulled forwardly by magnet structures 72, 73 as a selected card 46A, and is sensed at the sensor position by sensor 35. The sensor 35 contacts then close to deenergize coil 162, whereupon relay 161 quickly drops out to open contacts 163, 164 and motor $M_1$ is controllably braked to a stop with the selected card 46A travelling from its position opposite the sensor 35 into the delivery station 36, as shown in FIGURE 1. Opening of contact 167 removes the holding circuit about switch 142 and deenergizes the rectifier bridge 180. Closing of contacts 165, 166 energizes motor $M_2$ through contacts 171, 172 and it rotates to rotate cam plates 111–114 therewith.

In the following description the reference arrow 185 in FIGURE 7 will be used to identify cam positions. In the initial rotation of the motor $M_2$ after closing of contacts 165, 166, the cam point 0, 5 rotates clockwise away from the reference arrow 185 and the wedge projections 147 move toward the drum, as indicated by the arrows in FIGURE 9, until the cam point 1 reaches the reference arrow 185. This movement is likewise numbered 1 in FIGURE 8 and it is interrupted while the rotating cam plates 112, 113 effect movement of the arms 125, 126 to bring the wedges 147 together at opposite sides of the selected card 46A, as indicated at 2 in FIGURE 8 and by the arrows in FIGURE 10, the point 2 on the cams moving alignment with the reference arrow 185.

The motor $M_2$ continues to rotate and cam point 3 moves into alignment with the reference arrow 185 to produce the inward movement likewise numbered 3 in FIGURE 8 and by the arrows in FIGURE 11. The motor $M_2$ next rotates the cam point 4 into alignment with the reference arrow 185 to produce the movement likewise numbered 4 in FIGURE 8 in which the wedges 147 separate the cards 46 from the selected card 46A.

During the rotation of the cam plate 114 to place the cam point 4 at the arrow 185, the projection 143 engages and operates switch 141 to open contact 171, deenergizing motor $M_2$, and to close contact 173 to initiate the X–Y mechanism control. The motor $M_2$ is controllably braked to a stop with the cam point 4 aligned with the reference arrow 185 and the wedges 147 in the position shown in full line in FIGURE 13, the projection 143 maintaining the switch 141 in its operated position. The selected card 46A is thereby centered or indexed at the delivery station 36 in engagement with the X–Y mechanism parts 37, 38 and with the cards 46 separated from the selected card 46A by the spread wedges 147. The X–Y mechanism may then operate to manipulate the card 46A in prescribed manner and the return of the card to the drum initiates another operation as previously described.

The drum 33 as in FIGURE 1 may itself be considered as a magazine which may be bodily removed with the cards therein and a new or the refilled drum substituted.

FIGURES 22–25 illustrate a modified form of storage drum 33A in which the cards may be kept in a plurality of magazines which, with the cards therein, may be bodily inserted in and removed from the drum. In this modification the drum comprises a central hub 97A having an annular bottom plate 186 integrally secured thereto. The drum 33A is mounted on the driving shaft 103 and the cover post 101 substantially as is the drum 33 in the first embodiment, except that its central bore extends entirely through the hub 97A and the pin 106A is inserted in a slot from the top and held by a set screw 187. The pin 106A is received in the notch 107 in the shaft 103 to rotate the drum 33A therewith.

At the top of the hub 97A are mounted a plurality of radially extending spring fingers 188, as by studs 189 and locating pins 191. The fingers 188 have latching holes 192 therethrough to receive pins 193 which project upwardly from the inner top surfaces of magazines 194. Pins 195 extend downwardly from the inner bottom surfaces of the magazines and project into complementary holes 196 in bottom plate 186 whereby the magazines are held on the drum by the latching of the pins 193, 195 in the holes 192 and 196, respectively.

The magazines 194 are substantially sector-shaped and are normally located to have spaces 197A therebetween to permit relative movement between the magazines at the delivery station. To locate the magazines relative to each other while permitting them to move relative to the drum, their forward bottom surfaces are provided with posts 197 having radial slots 198 therein. The posts 197 extend into larger holes 199 through the drum bottom plate 186, into which holes also project spring fingers 201. The fingers 201 are brazed or staked in slots in the upper surface of the plate 186 and are received in the slots 198.

To remove a magazine from the drum from the position of FIGURES 22 and 23, the spring finger 188 associated therewith may be lifted to disengage the hole 192 from the pin 193, whereupon the magazine may be tilted forwardly and then lifted upwardly to remove the pin 195 from the hole 196, this also lifting the post 197 out of the hole 199 and disengaging the finger 201. A substitute magazine may then be inserted with equal facility by engaging post 197 in hole 199 and pin 195 in hole 196 while the magazine is tilted slightly outwardly and then the upper portion of the magazine moved inwardly to latch the pin 193 in the hole 192. The magazines 194 may move circumferentially within the limits of movement of the posts 197 in the holes 199 against the bias of the springs 201 which tend to locate the posts 197 centrally in the holes.

The other features of the device disclosed in the preferred embodiment with respect to the retaining flanges 155 and 158, the selector 34, the sensor 35 and the card-indexing and cards-separating wedges 147 are associated with the drum 33A in the same manner as with the drum 33.

While certain preferred embodiments of the invention have been specifically illustrated and described, it will be understood that the invention is not limited thereto as many variations will be apparent to those skilled in the art and the invention is to be given its broadest interpretation within the terms of the following claims.

I claim:

1. A random access storage and retrieval device for card-type items comprising: storage means for holding a plurality of said items; a plurality of said items in said storage means in side by side relation; coding means at the forward edges of said items for uniquely identifying them; selector means located adjacent the edges of said items for addressing a single one of said items by its identifying code, said coding and selector means permitting limited movement of the addressed item only out of the storage means; means for effectively relative movement transversely of the items between said storage and selector means to position successive items adjacent the selector means; magnet means at said selector means cooperating with the magnetic means on the addressed item for withdrawing said item from the storage means the limited amount provided by the coding and selector means; and sensor means located on the downstream side of said selector means with respect to said relative movement for determining that a selected card has been so withdrawn.

2. The random access storage and retrieval device defined in claim 1 including: means responsive to operation of said sensor means for terminating said relative movement with the selected card at a delivery station.

3. The random access storage and retrieval device defined in claim 2 including: means at said delivery station for centering said selected card and for separating the other cards therefrom to facilitate movement of the selected card with respect to the storage means.

4. The random access storage and retrieval device defined in claim 1 in which said magnet means presents pole faces to the magnetic means on said addressed item whose distance from the storage means increases in the direction of relative movement between said storage and selector means whereby as the magnetic means on the item continues to bridge the pole faces on the magnet means it pulls the item from the storage means the amount of the pole face spacing therefrom.

5. A random access storage and retrieval device for card-type items comprising: storage means for holding a plurality of said items; a plurality of said items in said storage means in side by side relation; coding means at the forward edges of said items for uniquely identifying them; selector means located adjacent the edges of said items for addressing a single one of said items by its identifying code, said coding and selector means permitting limited movement of the addressed item only out of the storage means; means for effecting relative movement transversely of the items between said storage and selector means to position successive items adjacent the selector means; magnet means at said selector means cooperating with the magnetic means on the addressed item for withdrawing said item from the storage means the limited amount provided by the coding and selector means; and means for temporarily positively holding all the items adjacent the selector means within the storage means against movement toward the magnet means while the item addressed within the selector means is being changed.

6. A random access storage and retrieval device for card-type items comprising: storage means for holding a plurality of said items; a plurality of said items in said storage means in side by side relation; coding means at the forward edges of said items for uniquely identifying them; selector means located adjacent the edges of said items for addressing a single one of said items by its identifying code, said coding and selector means permitting limited movement of the addressed item only out of the storage means; means for effecting relative movement transversely of the items between said storage and selector means to position successive items adjacent the selector means; magnet means at said selector means cooperating with the magnetic means on the addressed item for withdrawing said item from the storage means the limited amount provided by the coding and selector means; a pair of elements at said delivery station; a delivery station; means for stopping a selected addressed item at said delivery station; means for first moving said elements a limited amount forwardly to overlap the edge of the selected card but short of the other cards in the storage means; means for moving said elements into engagement with the opposite sides of the selected card to center it at the delivery station; means for moving said elements forwardly between the selected card and the cards at opposite sides thereof; and means for thereafter moving said elements apart to separate the other cards from the selected card to facilitate withdrawal and return of the selected card to the storage means.

7. The random access storage and retrieval device defined in claim 6 including: means for moving said elements directly back to their original positions after return of a selected card to the storage means whereby said elements traverse paths conforming generally to the letter P and the letter P reversed.

8. The random access storage and retrieval device defined in claim 6 including: means for moving said elements to retrace their paths back to their original positions after return of a selected card to the storage means whereby said elements traverse paths conforming generally to a letter P with an open back and a reversed letter P with an open back.

9. A random access storage and retrieval device for card-type items comprising: storage means for holding a plurality of said items; a plurality of said items in said storage means in side by side relation; coding means at the forward edges of said items for uniquely identifying them; selector means located adjacent the edges of said items for addressing a single one of said items by its identifying code, said coding and selector means permitting limited movement of the addressed item only out of the storage means; means for effecting relative movement transversely of the items between said storage and selector means to position successive items adjacent the selector means; magnet means at said selector means cooperating with the magnetic means on the addressed item for withdrawing said item from the storage means the limited amount provided by the coding and selector means, said storage means comprising a drum rotatable about a vertical axis past the selector means; and a plurality of separate, individual magazines circumferentially spaced about the drum and having the items stored therein radially of the drum in vertical planes and with each magazine and the items therein individually bodily removable and replaceable in the drum.

10. The random access storage and retrieval device defined in claim 9 in which the radially outward ends of said magazines are individually circumferentially movable relative to the drum and the other magazines to center an item in the angularly moving magazine at a delivery station.

11. A delivery station mechanism for operating on a selected card-type item disposed in a store and located at said station, said mechanism including a pair of elements disposed at opposite sides of said delivery station; means for moving said elements to first engage the opposite sides of said selected item to center it in the delivery station; and means for further moving said elements to separate the items adjacent the selected item therefrom.

12. The delivery station mechanism defined in claim 11 in which said means includes: means for first moving said elements toward the store to overlap the selected item while clearing the other items in the store; means for thereafter moving said elements toward each other to center the selected item therebetween at the delivery station; means for thereafter advancing said elements into the store at opposite sides of said selected item; and means for thereafter separating said elements to move the other items in the store away from the selected item to facilitate its withdrawal and return.

13. The delivery station mechanism defined in claim 12 including: means for moving said elements directly back to their original positions whereby the paths traversed thereby conform generally to the letter P and the letter P reversed.

14. The delivery station mechanism defined in claim 12 including: means for moving said elements to retrace their paths back to their original positions whereby the paths traversed thereby conform generally to a letter P with an open back and to a reversed letter P with an open back.

15. The delivery station mechanism defined in claim 12 in which said means include: a pair of arms supporting said elements; means intermediate the ends of said arms mounting them for universal movement; and rotating cam means for effecting straight line movements of the ends of said arms remote from said elements to effect corresponding movements of the elements.

16. A selector for edge notch coded card-type items mounted in a store comprising: a plurality of means providing edges transverse to the edges of the items; means for moving each selector edge means to one of two alternate positions corresponding to binary 0 and 1 numbers; and magnet means associated with said selector adjacent the item edges to attract magnetic means mounted on the items whereby to withdraw an addressed item from the store when the positions of the selector edges and of the item notches all correspond, said selector edges operating to prevent movement of non-addressed items from the store; and means for temporarily positively holding all the items adjacent the selector within the store against movement toward the magnet means while the positions of the selector edge means are being changed to address a different item.

17. The selector defined in claim 16 in which said temporary holding means comprising an arm positionable across all of the items adjacent the selector to positively prevent movement of the items; and means for so positioning said arm.

18. A selector for edge notch coded card-type items mounted in a store comprising: a plurality of means providing edges transverse to the edges of the items; means for moving each selector edge means to one of two alternate positions corresponding to binary 0 and 1 numbers; and magnet means associated with said selector adjacent the item edges to attract magnetic means mounted on the items whereby to withdraw an addressed item from the store when the positions of the selector edges and of the item notches all correspond, said selector edges operating to prevent movement of non-addressed items from the store, said selector edge means comprising plates extending transversely across a plurality of said items; and solenoid means for effecting movement of said plates to position their edges to address a desired card.

References Cited

UNITED STATES PATENTS

| | | | |
|---|---|---|---|
| 3,176,279 | 3/1965 | Lin | 129—16.1 X |
| 3,206,269 | 9/1965 | Curtis | 129—16.1 X |
| 3,273,565 | 9/1966 | Townsley | 129—16.1 |
| 3,299,554 | 1/1967 | Leaver | 129—16.1 X |

M. HENSON WOOD, Jr., *Primary Examiner.*

RICHARD A. SCHACHER, *Assistant Examiner.*

U.S. Cl. X.R.

129—16.1

PO-1050
(5/69)

UNITED STATES PATENT OFFICE
CERTIFICATE OF CORRECTION

Patent No. 3,429,436 Dated February 25, 1969

Inventor(s) EUGENE H. IRASEK

It is certified that error appears in the above-identified patent and that said Letters Patent are hereby corrected as shown below:

Column 11, Claim 1, line 53, the word "effectively" should be -- effecting --; line 57, before "magnetic" the word "the" should be deleted.

Column 12, line 20, before "magnetic" the word "the" should be deleted; line 41, before "magnetic" the word "the" should be deleted.

Column 13, line 7, after "with" the word "the" should be deleted.

SIGNED AND
SEALED
MAR 10 1970

(SEAL)
Attest:

Edward M. Fletcher, Jr.
Attesting Officer

WILLIAM E. SCHUYLER, JR.
Commissioner of Patents